Aug. 10, 1943.  E. S. DODGE ET AL  2,326,291
TYPEWRITING AND LIKE MACHINE
Filed Aug. 18, 1939   10 Sheets-Sheet 2
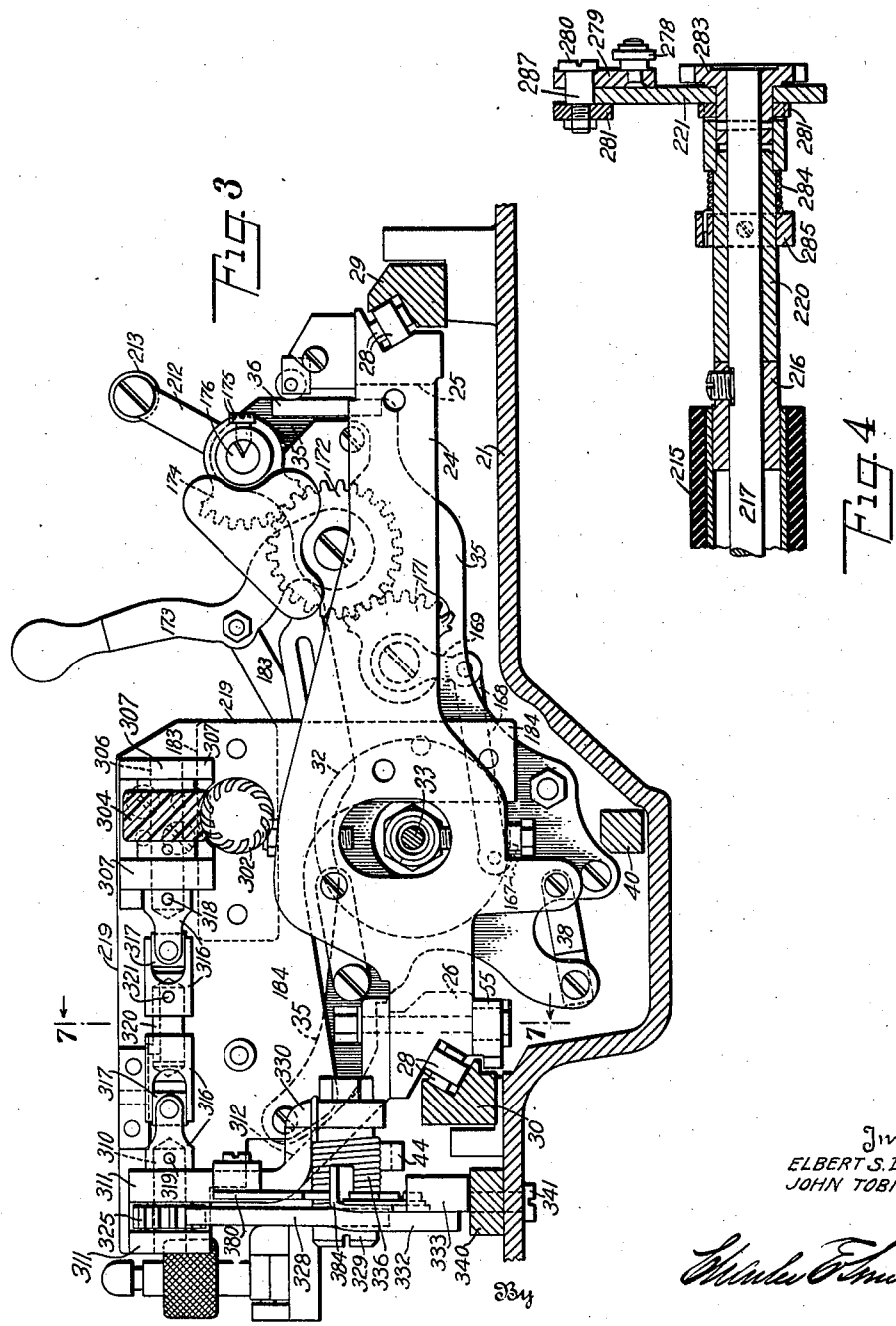
Inventors
ELBERT S. DODGE
JOHN TOBIN
Attorney

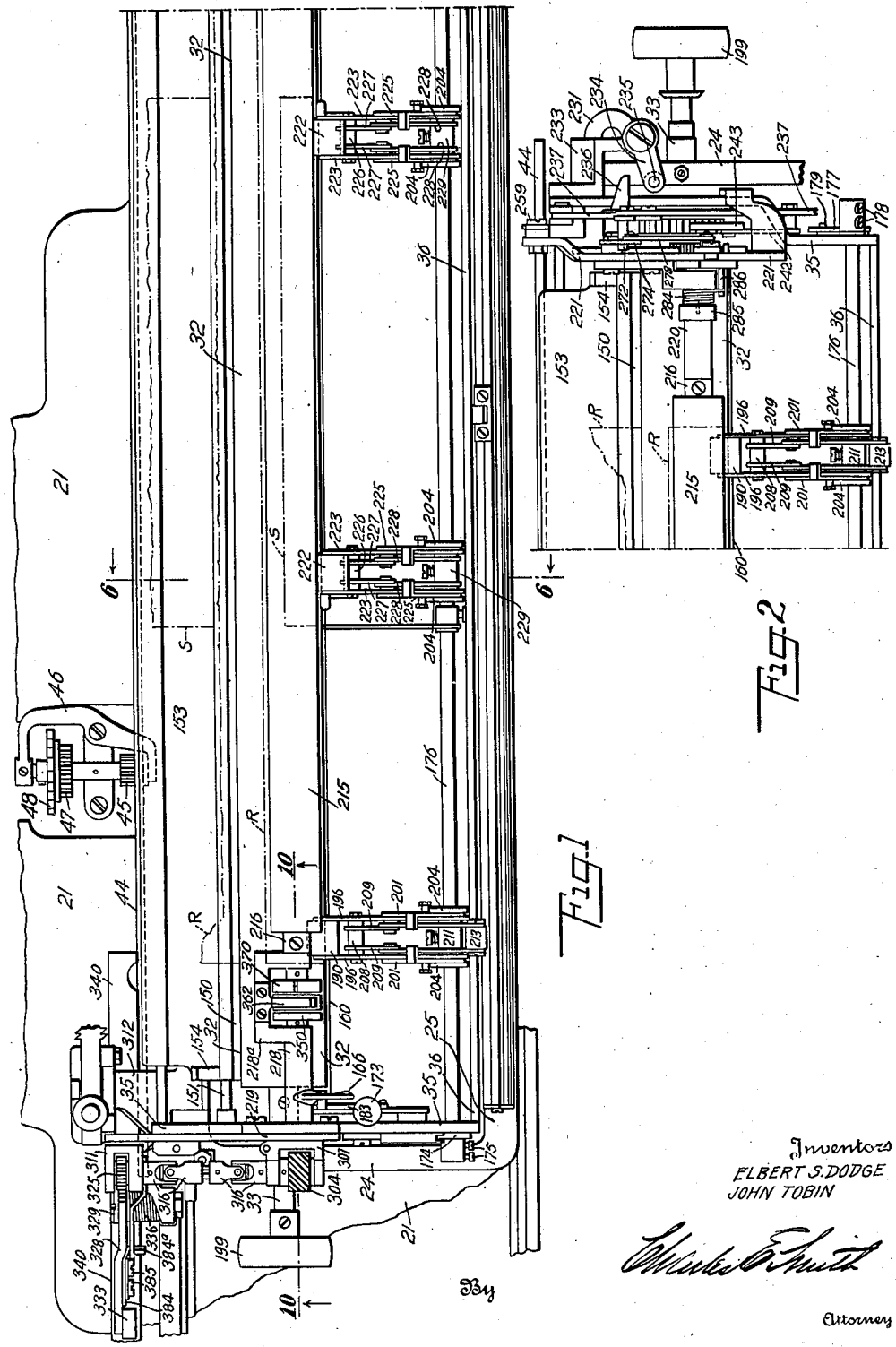

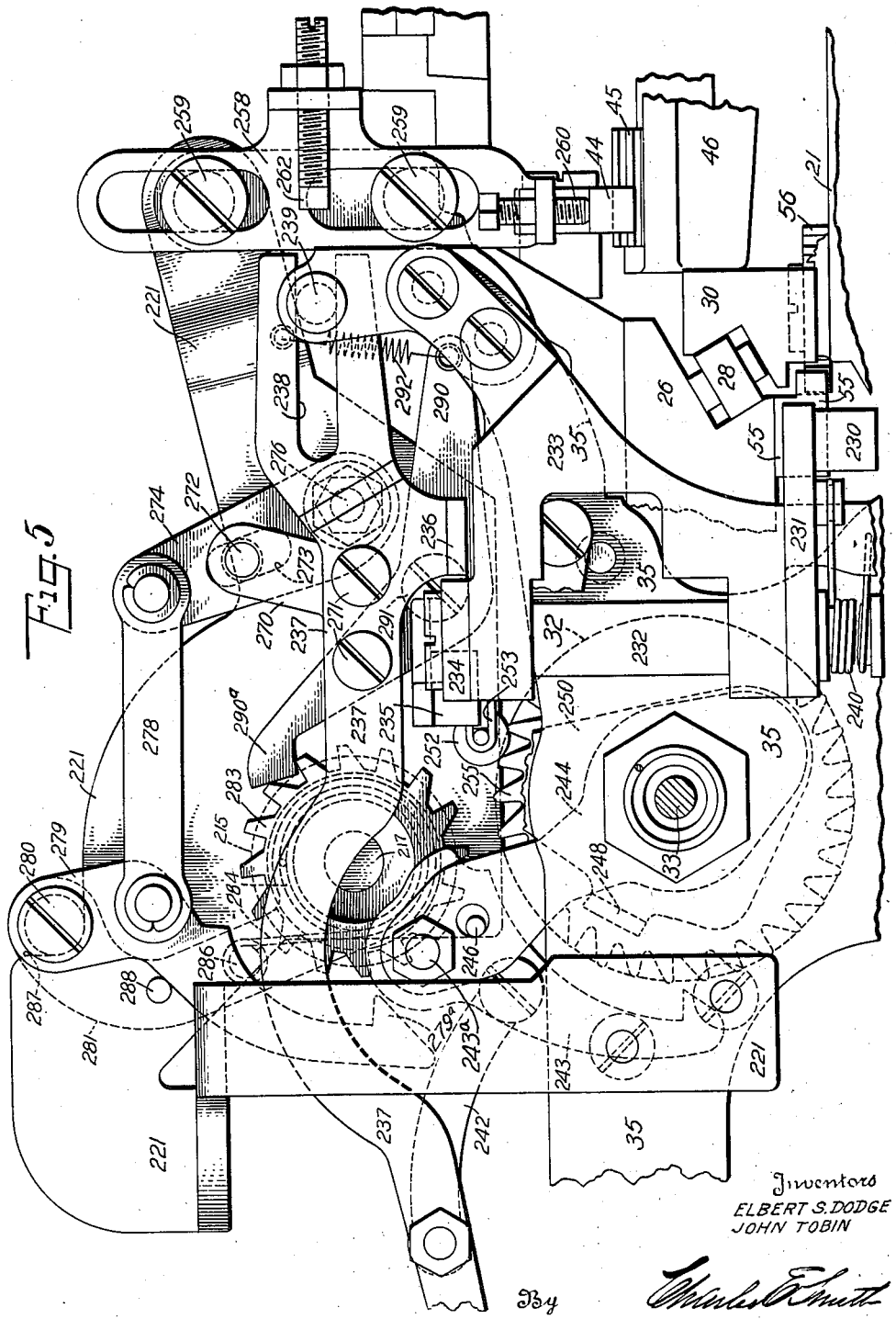

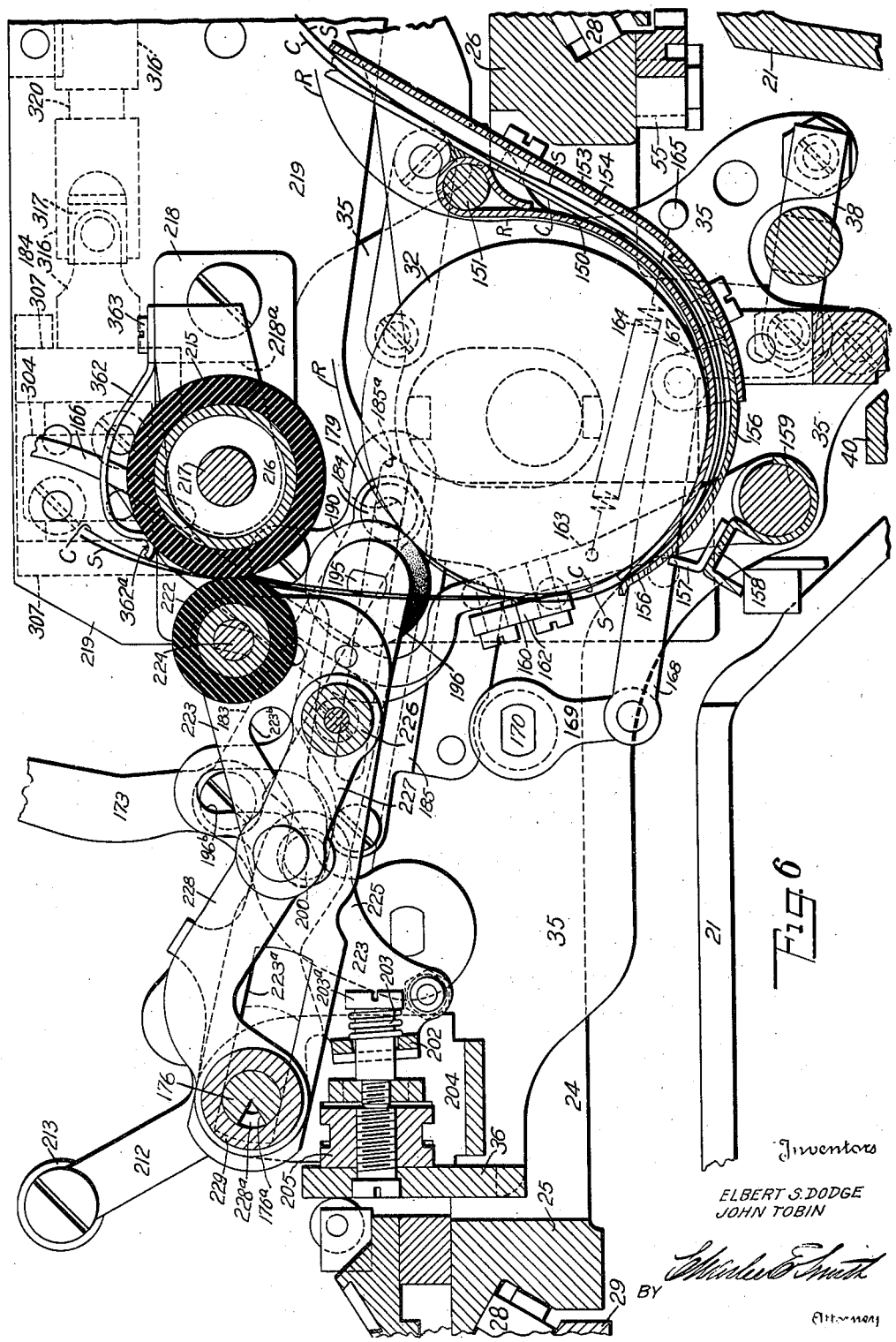

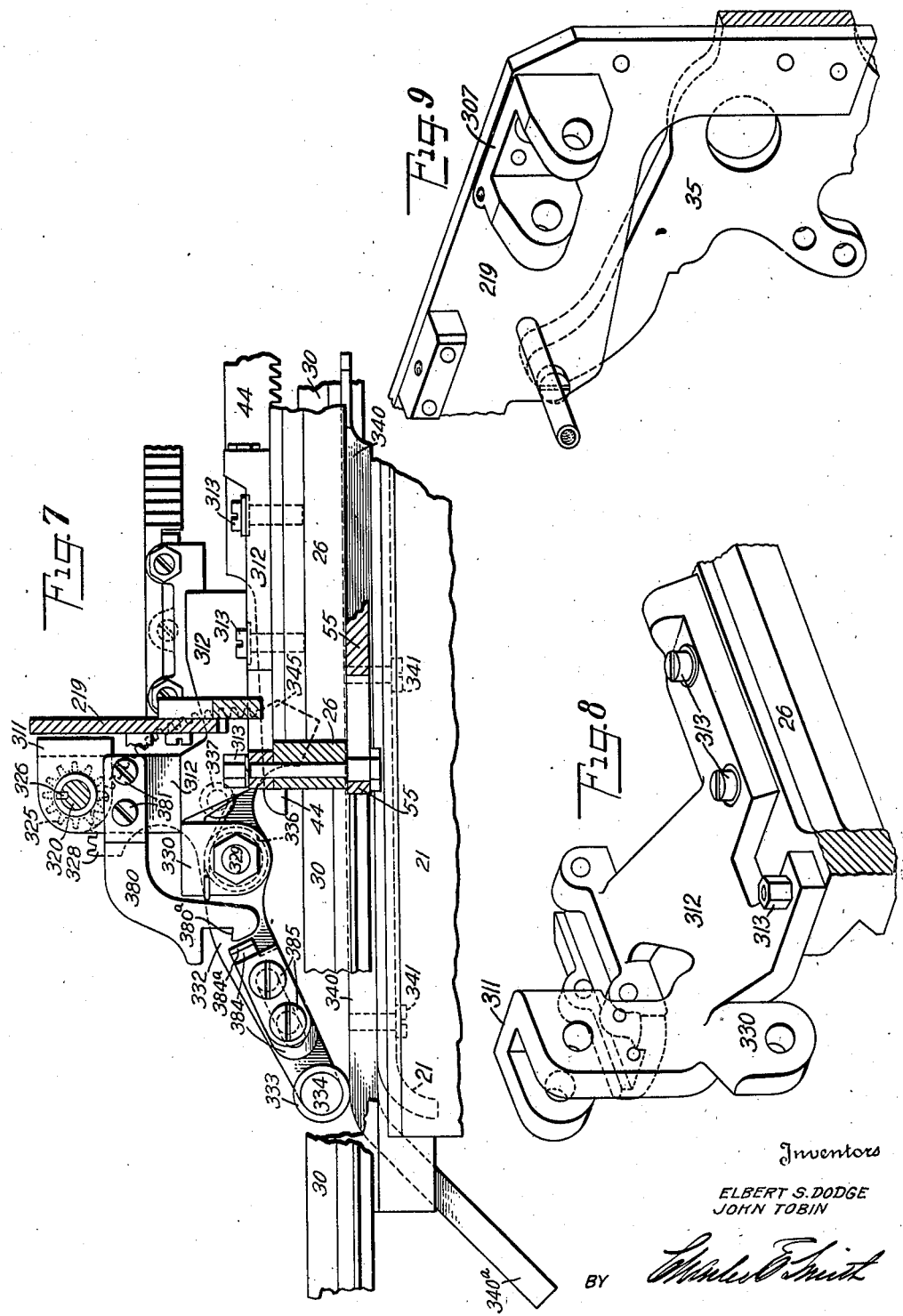

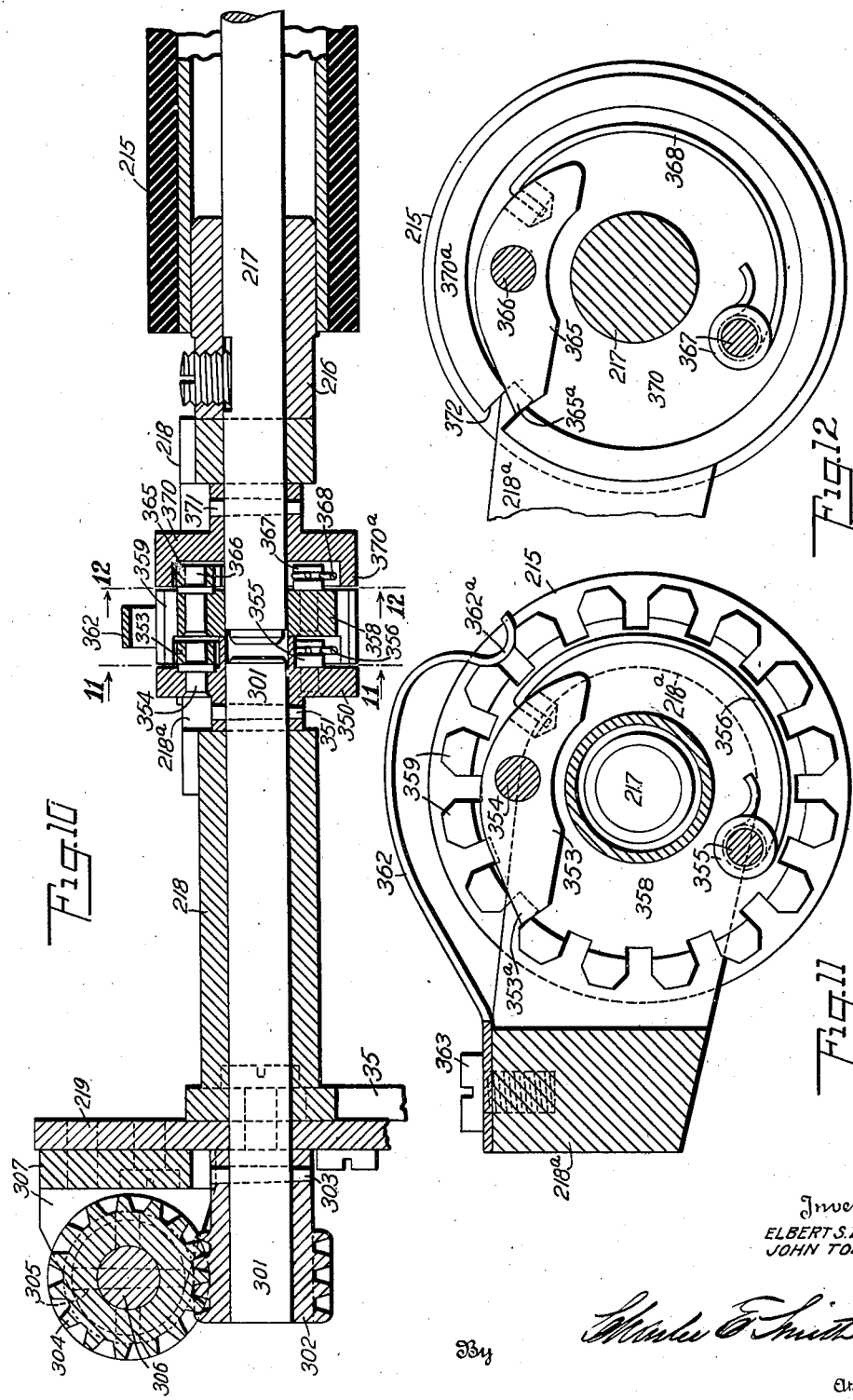

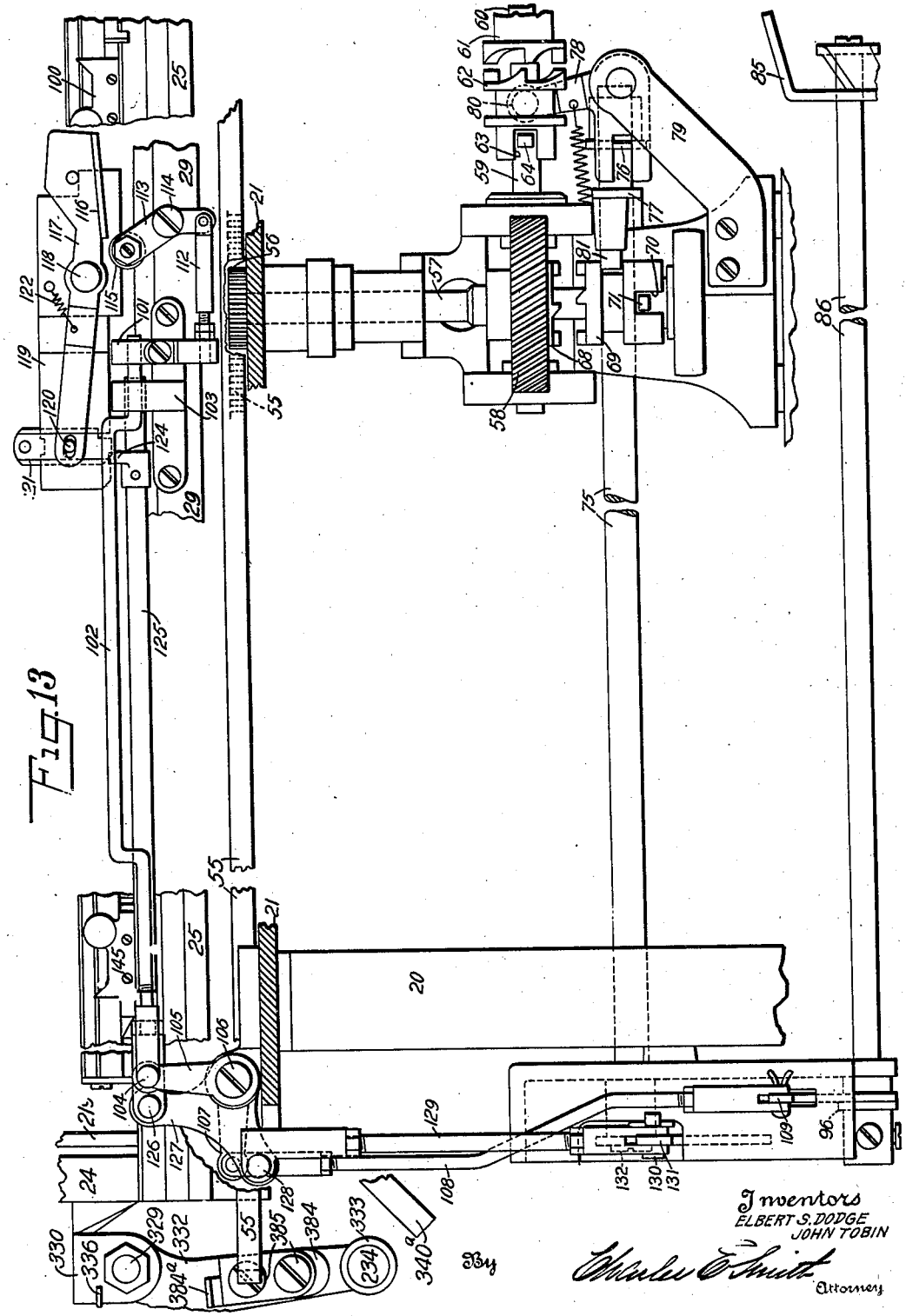

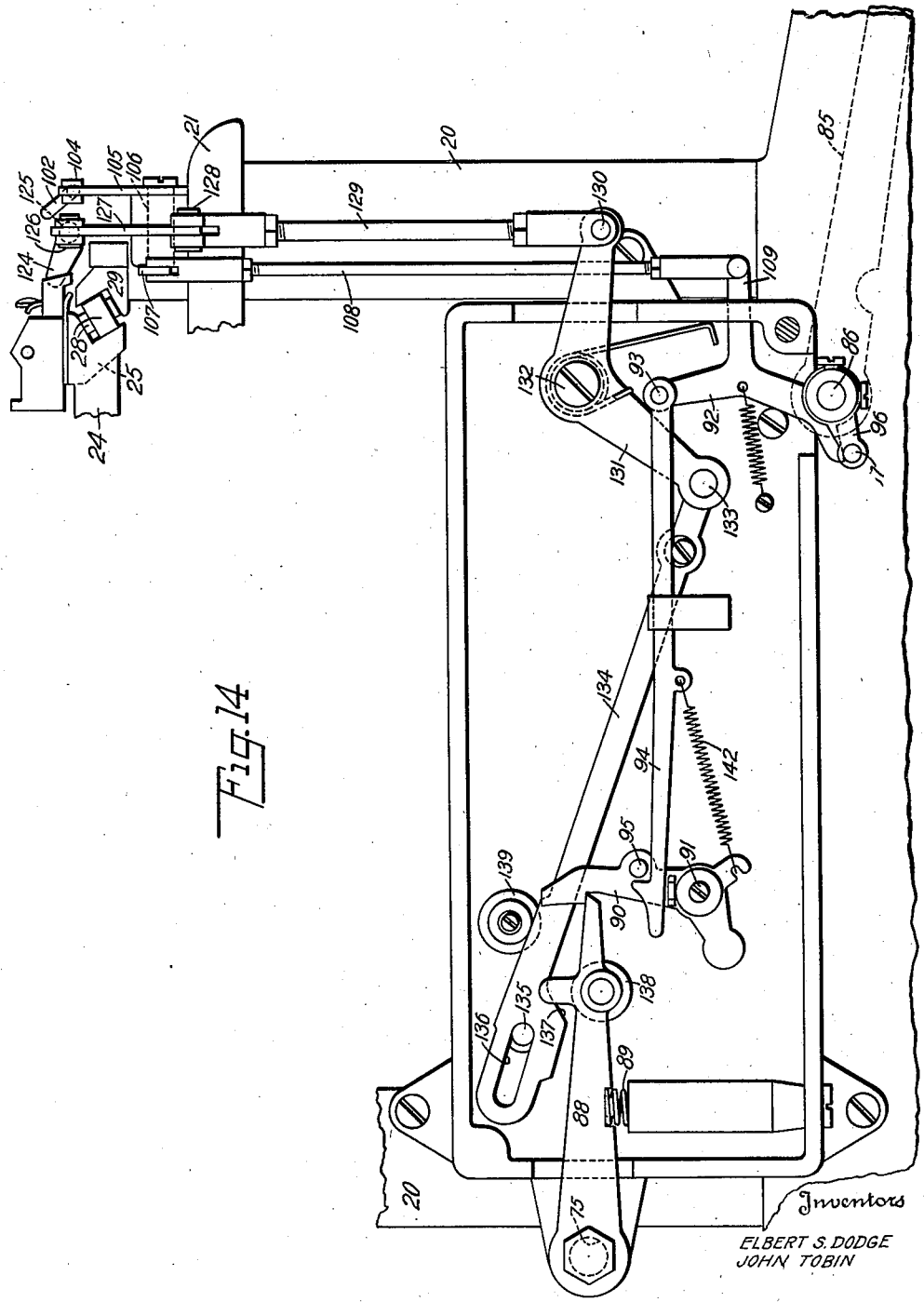

Aug. 10, 1943.    E. S. DODGE ET AL    2,326,291
TYPEWRITING AND LIKE MACHINE
Filed Aug. 18, 1939    10 Sheets-Sheet 9

Fig.15

| CORN.EXCH | 1ST. NATL | PAY TO THE ORDER OF | AMOUNT | CHECK NO. |
|---|---|---|---|---|
| 402 50 | | FARSON JONES | 402 50 | 517 |
| | 35 66 | T P HOWSER BUFFALO N Y | 35 66 | 518 |
| | 157 50 | JOHN G JOHNSON 465 WASHINGTON ST BUFFALO N Y | 157 50 | 519 |

CHECK REGISTER

No. 517
376
PAY TO THE ORDER OF  FARSON JONES    $  402 50
186

No. 518
PAY TO THE ORDER OF  T P HOWSER    $  35 66
BUFFALO N Y
186

No. 519
PAY TO THE ORDER OF  JOHN G JOHNSON    $  157 50
465 WASHINGTON ST
BUFFALO N Y

186

No. 521
PAY TO THE ORDER OF    $
186

No. 522
PAY TO THE ORDER OF    $

Inventors
ELBERT S. DODGE
JOHN TOBIN
By *Charles T. Smith*
Attorney

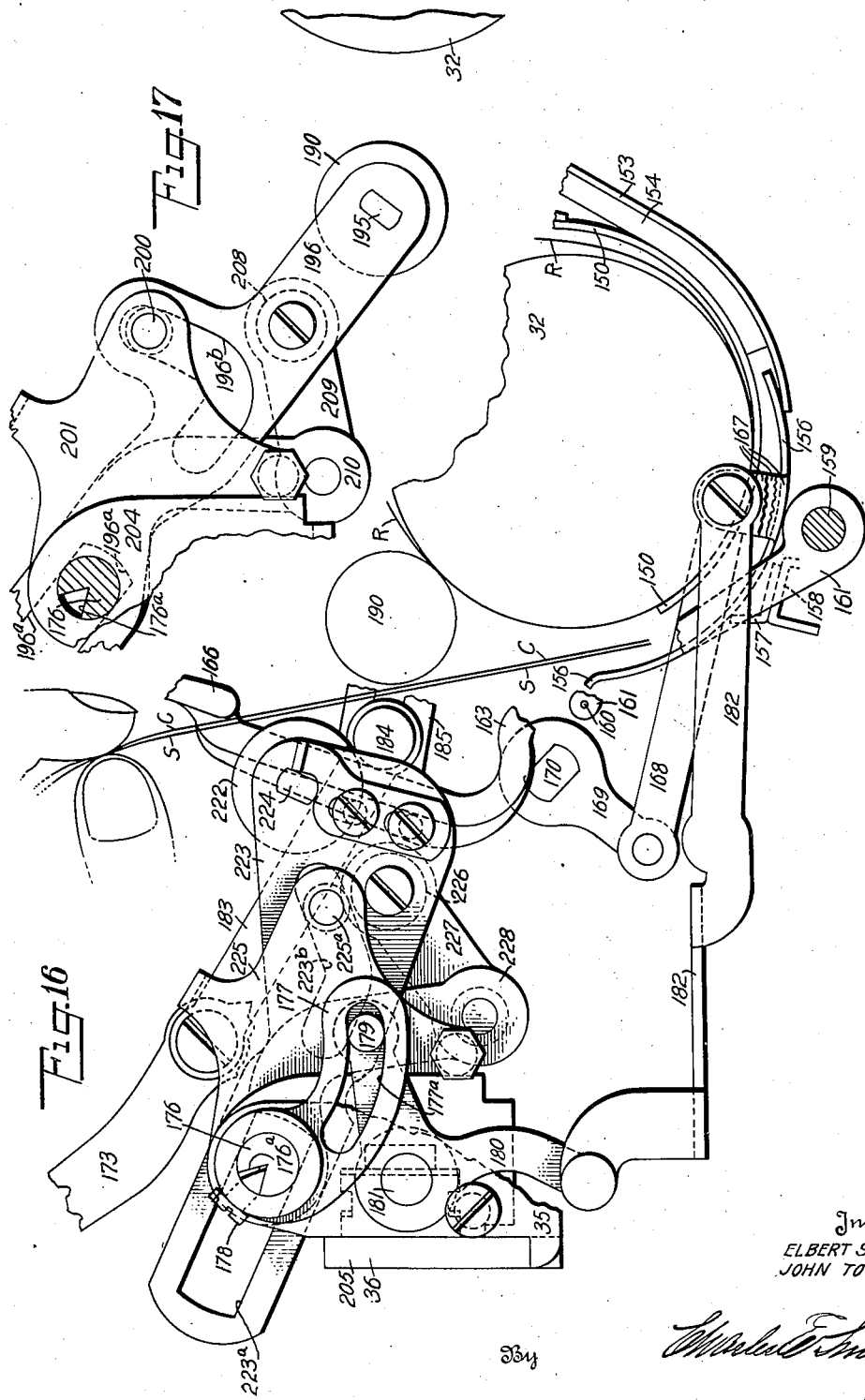

Patented Aug. 10, 1943

2,326,291

UNITED STATES PATENT OFFICE 2,326,291

TYPEWRITING AND LIKE MACHINE

Elbert S. Dodge and John Tobin, Ilion, N. Y., assignors to Remington Rand Inc., Buffalo, N. Y., a corporation of Delaware Application August 18, 1939, Serial No. 290,882

25 Claims. (Cl. 197—128)

Our invention relates to typewriting, combined typewriting and computing, and like machines, and more particularly to paper feeding mechanism for such machines.

The main object of our invention, generally stated, is to provide improved means in such machines for independently feeding in correlated condition a plurality of sheets into a position for simultaneously entering items thereon.

A further object of our invention is to provide means of character specified which may be readily embodied in existing machines without modifying, or materially modifying the structural features thereof.

A more specific object of our invention is to provide, in a typewriting or like machine, improved means for at times feeding a work sheet comprising a series of forms in unison with a record sheet, and means for at other times feeding the work sheet from one form to the next independently of the record sheet.

A further and more specific object of our invention is to provide, in the mechanism specified above, means for feeding the work sheet relative to the record sheet the required amount to bring each form on the work sheet to the first writing line position irrespective of the number of lines written on the preceding form.

A still further object of our invention is to provide means of the character specified which is controlled by the movement of the carriage in a manner to afford a simultaneous line spacing movement of the work sheet and record sheet when the carriage is returned to one predetermined position, and to afford an extra long feed movement of the work sheet only when the carriage is returned to another predetermined position.

To the above and other ends which will hereinafter appear, our invention consists of the features of construction, arrangement of parts and combinations of devices set forth in the following description and particularly pointed out in the appended claims.

In the accompanying drawings wherein like reference characters designate corresponding parts in different views:

Fig. 1 is a fragmentary, top, plan view of a portion of a machine equipped with the devices of our invention.

Fig. 2 is a fragmentary, top, plan view of the portion of the same machine which is adjacent the right-hand side of the portion shown in Fig. 1.

Fig. 3 is a fragmentary, side elevational view of the lefthand end of the carriage, the view showing certain parts in section.

Fig. 4 is a vertical, sectional detail view of the right hand end portion of the auxiliary feed roller and associated parts.

Fig. 5 is an enlarged, fragmentary, side elevational view of the right hand end portion of the carriage.

Fig. 6 is an enlarged, fragmentary, sectional view taken on line 6—6 of Fig. 1 and viewed in the direction of the arrows at said line.

Fig. 7 is a fragmentary, sectional detail view taken on line 7—7 of Fig. 3, and viewed in the direction of the arrows at said line.

Fig. 8 is a fragmentary, perspective view of a detail of the mechanism shown in Fig. 3.

Fig. 9 is a fragmentary, perspective view of another detail of the mechanism shown in Fig. 3.

Fig. 10 is an enlarged, fragmentary, sectional view of the auxiliary feed roller and some of the associated parts, the same being taken on line 10—10 of Fig. 1 and viewed in the direction of the arrows at said line.

Fig. 11 is an enlarged, transverse sectional view of the same taken on line 11—11 of Fig. 10 and viewed in the direction of the arrows at said line.

Fig. 12 is an enlarged transverse sectional view of the same taken on line 12—12 of Fig. 10 and viewed in the direction of the arrows at said line.

Fig. 13 is a fragmentary, front elevational view of a portion of the carriage return and control mechanism embodied in the present machine.

Fig. 14 is a fragmentary, detail, side elevational view of the control device for the carriage return mechanism.

Fig. 15 is a fragmentary, face view of a typical work and record sheet assembly as employed in a machine embodying the present invention.

Fig. 16 is a fragmentary view similar to Fig. 6 but showing certain parts in their released position to aid in the insertion of work sheets.

Fig. 17 is another fragmentary view similar to Fig. 6 but showing certain other parts in their released position.

We have shown our invention in the present instance embodied in a combined typewriting and computing machine which from certain aspects may be like that disclosed in the patent to F. A. Hart 2,063,737 dated December 8, 1936. This machine is known generally as a Remington electrified bookkeeping machine, and is equipped with a power actuated carriage return mechanism of the type shown in the patent to F. A. Hart, No. 1,978,997 dated October 30, 1934. In the present instance, we have illustrated only so much of said machine as may be necessary to arrive at an understanding of our invention in its embodiment therein.

While the devices of the present invention may be readily incorporated in the machine referred to without modifying, or materially modifying, the existing structural features thereof, it should be understood that the invention is not restricted to use in the machine mentioned but may be employed in typewriting, combined typewriting and computing and like machines generally, wherever found available.

The lower portion of the machine has not been shown in the drawings but it is intended that said portion may be constructed as shown in said Hart Patent No. 2,063,737 and includes the usual power actuated printing mechanism and other associated devices mounted within the usual two-part base (not shown) from which corner posts, such as 20 shown in Fig. 13, extend upwardly to a top plate 21 shown in Figs. 1, 2, 3 and 13.

A carriage of the usual construction employed in Remington electrified bookkeeping machines is mounted to travel over the top plate 21 of the machine from side to side thereof, and is propelled in the direction of its step-by-step letter space movement by the usual spring drum (not shown), and under control of the usual escapement mechanism and tabulator mechanism.

The carriage, which is shown in part in Figs. 1, 2 and 3, comprises end bars 24, a front cross bar 25 and a rear cross bar 26. The carriage is mounted in the usual manner to travel on crossed bearing rollers 28 received between grooved bearings of the front and rear cross bars 25 and 26 and oppositely disposed grooved bearings in fixed front and rear guide bars or rails 29 and 30 respectively. A platen 32 of the usual construction is mounted for substantially vertical case shifting movement on the carriage of the present machine. The platen 32 is provided with oppositely extending platen shafts 33 which are rotatively supported in the usual manner in a case shifting platen frame. Said frame comprises end plates 35, as shown in Figs. 1, 2 and 3, which are joined at the front by a cross bar 36 and joined in a similar manner in the rear by means not shown.

The usual means are provided for guiding the case shifting platen frame in its shifting movements relative to the carriage, which means include connecting links 38 (see Fig. 3) connecting each of the case shifting side plates 35 with the companion carriage end bar 24. The usual means is also provided for effecting the case shifting movements of the shiftable frame which includes a rail 40 which is power actuated to effect the case shifting movement of the shiftable frame through an anti-friction connecting means which has not been shown.

The step-by-step letter space movement of the carriage is controlled in the usual manner by a feed rack 44 releasably mounted on the rear cross bar 26 of the carriage (see Fig. 3) to coact with a pinion 45 as shown in Fig. 1. The shaft of the feed pinion 45 is rotatively mounted in a bracket 46 secured to the top plate 21 of the machine frame, and this shaft is operatively connected through a one-way ratchet driving means 47 of the usual construction to an escapement wheel 48. The ordinary dog rocker escapement mechanism (not shown) coacts with the teeth of the escapement wheel 48 to afford a letter space advance movement of the carriage upon each actuation of a printing instrumentality or the space bar in the usual manner.

The present machine is equipped with power actuated carriage return mechanism which may be actuated at any point in the travel of the carriage, or automatically at the end of the line, to return the carriage to the right in position to begin a new line of writing. The power actuated carriage return mechanism used in the present instance is shown in the above mentioned Hart Patent No. 1,978,997 and will now be briefly described.

Referring more particularly to Fig. 13 it will be seen that a carriage return rack 55 is operatively connected to the carriage (see Fig. 3) and meshes with a pinion 56 fixedly connected to the upper end of a vertical shaft 57. The shaft 57 is rotatively mounted in the frame of the machine, and a worm wheel 58 is loosely mounted on the lower end portion of the shaft 57. The worm wheel 58 meshes with a driving worm (not shown) which is fixedly secured to a horizontally disposed shaft 59. A driving shaft 60 is disposed in axial alignment with the shaft 59 and is constantly rotated by means of a continuously running electric motor (not shown) mounted in the usual manner at the rear of the machine. A clutch is provided for at times connecting the driving shaft 60 with the shaft 59, which clutch includes a toothed member 61 fixedly secured to the driving shaft 60 and a companion toothed member 62 connected for longitudinal movement on the shaft 59 by a slot 63 receiving a pin 64 secured to the shaft 59. A second clutch is provided for at times effecting an operative connection between the worm wheel 58 and the vertical shaft 57, which second clutch includes a toothed member 68 secured to the worm wheel 58 and a companion toothed member 69 mounted for longitudinal movement on the lower end of the shaft 57 by a slot 70 receiving a pin 71 attached to the shaft 57.

These two clutches are simultaneously controlled by a transverse rock shaft 75 mounted at the rear of the machine and having clutch controlling arms 76 and 77 secured thereto. The forward end of the arm 76 is operatively connected with a bell crank 78 pivotally mounted on a fixed bracket 79. The upper arm of the bell crank 78 carries a pin 80 which enters a groove in the clutch member 62, whereby the clutch member 62 may be moved longitudinally on the shaft 59 to engage or disengage the companion clutch member 61. In a similar manner, the arm 77 carries a pin 81 entering a groove in the clutch member 69, whereby the member 69 may be moved longitudinally on the shaft 57 into engaged or disengaged relation with the companion clutch member 68. Thus, it will be apparent that when the rock shaft 75 is rocked to simultaneously engage the clutches 61—62 and 68—69, the shaft 57 will be operatively connected with the continuously running driving shaft 60 to effect a return of the carriage through the pinion 56 and rack 55.

Referring more particularly to Fig. 14 it will be seen that a return movement of the carriage may be effected at any point in its line of travel by a manual operation of a carriage return key 85, in the usual manner. The carriage return key 85 is secured to the end of a rock shaft 86 mounted transversely of the machine to control the operation of the clutch controlling shaft 75 through the mechanism shown in Fig. 14. Thus it will be seen that the lefthand end of the clutch controlling rock shaft 75 carries a forwardly extending arm 88 which is acted upon by a spring 89 so that when the shaft 75 is rocked in a clockwise direction to a position which disengages the clutches 61—62 and 68—69 the forward end of the arm 88 engages a notch in a latch member 90 which is pivotally mounted at 91 on a control box or housing carried by the machine frame. An operation of the carriage return key 85 is effective to cause a forward releasing movement of the latch member 90 through a lever member 92 which is loosely mounted on the rock shaft 86 and is pivotally connected at 93 to a horizontal rearwardly extending link 94 which coacts with a pin 95 on the latch member 90. An arm 96 is fixedly secured to the lefthand end of the rock shaft 86 which carries a pin 97 engaging a shoulder on the arm 92 whereby a depression of the carriage return key 85 effects a forward movement of the arm 92 which acts through the pull rod 94 to cause a forward releasing movement of the latch 90. This releasing movement of the latch 90 allows the arm 88 to be operated upwardly under the force of the spring 89 thereby turning rock shaft 75 in a counter-clockwise direction to close the clutches 61—62 and 68—69 and initiate a return movement of the carriage.

The usual means are provided in the present instance for automatically actuating the latch member 90 to initiate a return movement of the carriage when it has been moved in a letter space direction to a predetermined adjustable point representing the end of a line. This automatic mechanism may be briefly described by referring to Figs. 13 and 14 wherein it may be seen that the front cross bar 25 of the carriage carries an adjustable line stop 100 which is adapted to engage an arm 101 secured to a rod 102 mounted for longitudinal movement by a bearing block 103 secured to the stationary guide rail 29. The lefthand end of the rod 102 is pivotally connected at 104 to the upper end of an upright arm 105 fixed to a short rock shaft 106 mounted on the machine frame. A second arm 107 is fixed to and extends horizontally from the rearward end of the shaft 106 and is pivotally connected at its outer end to a vertical rod 108. The vertical rod 108 is in turn pivotally connected at its lower end to a forward extension 109 on the arm 92, whereby a forward releasing movement of the latch member 90 may be effected to initiate a return movement of the carriage in the manner previously described. Such movement of the latch member 90 however is effected in the present instance by a movement of the carriage in a letter spacing direction to a point where the line stop 100 engages and actuates the arm 101 to effect a forward movement of the arm 92 through the rods 102 and 108 and thereby release the latch member 90 by a forward movement of the link 94.

The machine in the present instance is equipped with the mechanism shown in the patent to W. L. Peters 2,023,543 dated December 10, 1935, whereby the carriage may be automatically arrested in its return movement at either of two predetermined positions depending on whether the carriage return key 85 is held in its depressed position throughout the entire return movement of the carriage or merely depressed and released before the carriage reaches the first of said predetermined positions. I shall now briefly describe this mechanism for variably arresting the carriage in its return movement with particular reference to Figs. 13 and 14.

As may be seen in Fig. 13, the lower end portion of the arm 101 on the rod 102 is adjustably connected to a horizontally disposed link 112 which is in turn pivotally connected to the lower end of an arm 113 which is pivotally mounted intermediate its ends at 114 on the stationary guide rail 29. The arm 113 is normally positioned so that a roller 115 at the upper end thereof is beneath the path of travel of a cam portion 116 on a lever 117. The lever 117 is pivotally mounted at 118 on a bracket 119 which is adjustably mounted on the front carriage cross bar 25 in a similar manner to the line stop 100. The lefthand end of the lever 117 is operatively connected at 120 to a vertically sliding member 121 and a spring 122 acts on the arm 117 to normally hold the slide 121 in its uppermost position as is illustrated in Fig. 13.

Considering now that the carriage has been advanced to the left from the position illustrated in Fig. 13, the operator may initiate a power actuated return movement of the carriage by depressing the carriage return key 85 in the manner previously described. It will be clear that the forward movement of the arm 92 effected by depression of the key 85 will operate through the links 108 and 102 to rock the arm 113 about its pivot 114, thereby moving the roller 115 upwardly into the path of the cam 116 on the arm 117. Thus, if the operator holds the carriage return key 85 in its depressed position while the carriage is being returned to the right, the cam surface 116 will engage the roller 115 thereby operating the arm 117 about its pivot 118 to force the slide member 121 downwardly to a position where it will engage a carriage stop control arm 124. The arm 124 is fixedly secured to a rod 125 which is mounted at one end to slide in the bearing block 103 and pivotally connected at the other end at 126 to a bell crank 127. This bell crank is mounted to turn on the shaft 106 and is pivotally connected at 128 to a vertically disposed rod 129. Referring to Fig. 14, it may be seen that the lower end of the rod 129 is pivotally connected at 130 to the forwardly extending arm of a bell crank 131 pivotally mounted at 132 on the control box. The lower end of the bell crank 131 is pivotally connected at 133 to a sliding bar 134 which is supported for longitudinal movement at its rearward end by a pin 135 entering a slot 136. The lower edge of the bar 134 is provided with a cam face 137 which coacts with a roller 138 pivotally mounted on the arm 88, and the bar 134 is retained against upward transverse movement by a roller 139 pivotally mounted on the control box to coact with the upper edge of the bar 134.

It will now be apparent that when the operator holds the carriage return key 85 in its depressed position to hold the vertical slide member 121 in its lower position, the return movement of the carriage will continue to the right until the lower end of the slide member 121 engages and moves the arm 124 to the right. At this instant, the slide bar 134 will be moved forward through the connections just described which causes the cam face 137 to coact with the roller 138 and move the arm 88 downward to operate the clutch control shaft 75 in a manner to release the clutches 61—62 and 68—69. In this manner the return movement of the carriage is stopped at an intermediate position thereof determined by the setting of the bracket 119 along the carriage cross bar 25, and when the carriage return key 85 is released the slide member 121 is returned to its normal position, and the arm 124 together with all the parts operated thereby return to their normal position and the arm 88 is held in its lower position by the latch member 90 which is operated rearwardly under the force of the spring 142.

Now considering that the operator, in effecting a return movement of the carriage, releases the carriage return key 85 as soon as the return movement of the carriage has been initiated, it will be clear that the roller 115 will be in its lower position out of cooperative relation with the cam surface 116 of the arm 117 as it passes thereover. Thus the slide member 121 will not be moved downwardly into cooperative relation with the arm 124 and the carriage will not be arrested in its intermediate position. The carriage then continues in its return movement to the right until a contact face on a margin stop 145, which is adjustably mounted on the cross bar 25, engages and actuates the arm 124 to arrest the return movement of the carriage by causing the clutch members 61—62 and 68—69 to be disconnected in the manner hereinbefore described.

The arrangement of the mechanism cooperating with the platen to aid in the insertion and collating of work sheets may, from certain aspects, be similar to that disclosed in the patent to F. A. Hart No. 1,973,315, dated September 11, 1934. The arrangement of this mechanism may be generally described with reference to Figs. 1, 2 and 6, wherein it will be seen that a deflector plate 150 extends throughout the length of the platen 32 and is supported at the rear edge thereof on a rod 151 which extends between the end plates 35 of the case shiftable platen frame. The deflector plate 150 is curved to extend downwardly from the rod 151 around the lower surface of the platen to form a channel, which, in the present instance, receives a record sheet R introduced from the rear of the platen and fed forward and upward around the surface of the platen. A second deflector plate 153 is provided beneath the deflector plate 150 and is secured in spaced relation therewith by end spacing bars 154 to form a second channel between the two deflector plates, which, in the present instance, receives a strip S and a carbon sheet C as will later be more fully described.

The strip S and carbon sheet C are introduced into the channel between the two deflector plates 150 and 153 from the front of the platen, and in order to aid in the insertion thereof, a deflector section 156 is movably supported on the forward end of the lower deflector 153. This movable deflector section 156 is curved concentrically with the platen to form a continuation of the lower deflector 153 which terminates just below the printing line. The deflector section 156 is supported by contacting portions 157 of a bail 158 which is secured to a rock shaft 159 mounted for rocking movement in the carriage end plates 35.

A line indicating wire 160 is anchored at its right hand end to the upper end of an arm 161 (see Fig. 16) which extends upwardly from the right hand end portion of the rock shaft 159. The left hand end of the wire 160 is secured at 162 to the intermediate portion of an arm 163 (see Fig. 6) which extends upwardly from the left hand end portion of the rock shaft 159. A spring 164 extends between the left hand arm 163 and a pin 165 on the associated carriage end plate 35 and acts through the bail 158 to normally hold the deflector section 156 in its closed position as well as to hold the line indicating wire 160 in its effective indicating position. A finger piece 166 is formed by an upward extension of the left hand arm 163, whereby the line indicating wire 160 may be moved forwardly away from the platen and the bail 158 may be moved downward to allow the forward end of the deflector section 156 to move away from the surface of the platen as shown in Fig. 16.

In accordance with the present invention, means are provided to further aid in the insertion of the strip S and carbon sheet C from the front of the platen. Thus, the deflector section 156 is mounted for forward and upward sliding movement to provide an enlarged open mouth to receive and direct the strip S and carbon sheet C as shown in Fig. 16. As may be seen in Figs. 6 and 16, an upstanding ear 167 is provided at each side of the deflector section 156, and as may be seen in Fig. 6, the left hand ear 167 is pivotally connected to a link 168 which in turn is pivotally connected to the lower end of an arm 169 fixedly secured to a short shaft 170 rotatively mounted in the left hand carriage end plate 35. Referring to Fig. 3, it will be observed that a gear sector 171 is fixedly secured to the other end of the shaft 170, which gear sector meshes with a gear wheel 172 which is rotatively mounted on the associated carriage end plate 35 by a shaft (not shown) to which is secured an upstanding manual operating lever 173. The gear wheel 172 also meshes with a gear sector 174 which is secured at 175 to the left hand end of a rock shaft 176 mounted for rocking movement in the adjacent carriage end plate 35.

An arm 177 is connected at 178 to the right hand end of the rock shaft 176 as shown in Fig. 16, and a curved slot 177ᵃ in this arm receives a pin 179 secured to a bell crank 180 which is pivotally mounted at 181 on the right hand carriage end plate 35. The depending arm of the bell crank 180 is pivotally connected by a link 182 to the ear 167 at the right hand end of the deflector section 156.

It will now be clear that a forward movement of the manual operating lever 173 will operate through the gears 172 and 171 to pull forward and upward on the left hand end of the deflector section 156 through the arm 169 and link 168. At the same time, the right hand end of the deflector section 156 will receive a corresponding forward and upward movement by the turning of the rock shaft 176 through the gears 172 and 174, which turns the arm 177 and thus rocks the bell crank 180 through the camming action between the walls of the curved slot 177ᵃ and the pin 179 to pull forwardly on the link 182.

Means are provided in the present instance for causing an operation of the lever 166 whenever the lever 173 is operated, but to allow the lever 166 to be operated independently of the lever 173. Thus referring to Figs. 3, 6 and 16, it will be seen that a link 183 is pivotally connected at its forward end to the lever 173, and a transversely extending pin 184 is secured to the rearward end of the link. A bracket 185 (Fig. 6) is secured to the left hand carriage end plate 35, and a slightly inclined fore and aft slot 185ᵃ is provided in the bracket 185, which slot receives one end of the pin 184 for supporting and guiding the rearward end of the link 183. The other end of the pin 184 is arranged to engage and operate the lever 166 during a forward operation of the lever 176. This arrangement permits the lever 166 to be operated independently of the lever 173, but a forward manual operation of the lever 173 will operate the lever 166 through the link 183 and pin 184 to thereby rock the shaft 159.

Thus, at the same time that the deflector section 156 is moved forward and upward through the previously described connection operating on the ears 167, the shaft 159 is rocked to lower the bail 158 and allow the front edge of the deflector section 156 to move away from the platen and to move the line indicating wire 169 forward as shown in Fig. 16. As will be seen in this figure, this forward and upward released position of the deflector section 156 and the indicating wire 160 provides a large open throat permitting the strip S and carbon sheet C to be easily inserted into the channel between the deflectors 159 and 153.

In Fig. 15, the illustrated example of the strip S comprises a series of typical check forms which may be detached at perforations 186 after entries have been made thereon by the present machine. It is to be understood, however, that a strip S having any other kind of forms, headings or the like may be employed in the present machine.

The record sheet R is shown in Fig. 15 as a "check register" with the carbon sheet C interposed between it and the strip S, whereby the entries on the various check forms are duplicated in condensed form on the central portion of the "check register." The record sheet or "check register" extends each side of the strip S and certain entries may be made directly in these marginal portions which are not made on the strip S.

In accordance with the present invention, the strip S together with the carbon sheet C receives a line spacing movement simultaneously with the record sheet R. At other times, however, the strip and carbon sheet receive a greater extent of forward feed movement independently of the record sheet, in order to bring successive check forms on the strip to the first writing line position. Accordingly, auxiliary means are provided, as will later be described in detail, for line spacing the strip S and carbon sheet as well as for effecting this said greater extent of advance movement thereof.

Thus, the record sheet R only receives a line spacing movement by the platen, and accordingly two outer releasable feed rollers 190 (see Figs. 1, 2 and 6) are arranged to coact with the marginal portions of the record sheet only to hold it into engagement with the surface of the platen to be fed thereby. Each of the two outer feed rollers 190 is individually applied to effectively press the record sheet R into feeding engagement with the platen, and each of these feed rollers may be individually released so that no obstruction is offered to the introduction of the record sheet. This applying and releasing means for each of the outer feed rollers 190 is shown in the accompanying drawings as substantially the same construction as that shown in the previously mentioned patent to Hart No. 1,973,315.

The individual mechanism for applying and releasing each of the two feed rollers 190 may be identical, and referring to Figs. 1, 2, 6 and 17, it will be seen that a pivot 195 supports the feed roller 190 between two carriers 196, which carriers have longitudinal guide slots 196ª at their forward end portions receiving the rock shaft 176. The rearward portion of each of the carriers 196 is provided with a longitudinally and upwardly extending cam slot 196ᵇ which receives a pin 200 on a companion plate 201. Each of these plates 201 is provided with an aperture receiving the rock shaft 176, and the two plates are joined by a cross bar or yoke 202 (see Fig. 6) against which one end of a holding spring 203 bears. The opposite end of said spring bears against the head of a screw 203ª operatively connected to a mounting bracket 204 adjustable longitudinally of the carriage and carried jointly by the rock shaft 176 and a guide bar 205 secured to the cross bar 36 of the case shiftable platen frame. The function of the spring 203 is to hold the companion feed roller 190 and the associated parts in the position to which they are adjusted longitudinally of the carriage.

Each of the feed rollers 190 is moved to and from effective position by a toggle means, the straightening of the toggle means positively applying the feed rollers as shown in Fig. 6, and the operation of the toggle means from their straightened position moving the companion feed roller to its ineffective position shown in Fig. 17. The two carriers 196 are united by a cross rod 208 to which a pair of links 209 are pivotally connected. The forward end of each of the pair of links 209 is pivotally connected to a companion arm 210, and the two arms 210 are joined by a hub member 211, as may be seen in Fig. 6. The hub member 211 is rotatively mounted on the rock shaft 176, and each of the two arms 210 for each of the rollers 190 is provided with an upwardly extending handle portion 212, which portions are joined at their upper ends by a finger piece 213.

In the position of the parts shown in Fig. 6, it will be clear that the toggle arms 210 and the links 209 are in their straightened position which securely holds each of the feed rollers 190 in effective position relative to the platen. Thus, a rearward movement of the finger piece 213 will cause the toggle elements 210 and 209 to be moved out of their straightened position thereby moving the companion feed roller 190 away from the platen. During this movement, the cam slots 196ᵇ coact with their respective pins 200 to cause the companion feed rollers 190 to move forward and downward to its fully released position as shown in Fig. 17. It will be clear that when the feed rollers 190 are in their position shown in Fig. 17, they offer no resistance to the insertion of the record sheet R around the platen.

The auxiliary feeding mechanism for the strip S and carbon paper C includes an auxiliary feed roller 215 which may be of the usual rubber covered construction secured to hub members 216 which are attached to a shaft 217. This auxiliary feed roller 215 is illustrated in the present instance as extending throughout the greater portion of the length of the platen 32 and is disposed out of cooperation therewith and in upward spaced relation thereto. The left hand end portion of the auxiliary feed roller shaft 217 is mounted in a bearing member 218 carried by a bracket or supporting member 219 secured to the left hand end plate 35 of the case shiftable platen frame, as shown in Fig. 10. Referring to Figs. 2, 4 and 5, the right hand end of the shaft 217 is supported in a bearing member 220 carried by a bracket or supporting member 221 secured to the right hand end plate 35 of the case shiftable carriage frame.

The feed rollers 190 coact only with the marginal portions of the record sheet R, and accordingly the strip S and the underlying carbon sheet C are not pressed into effective feeding relation with the platen but are free to be moved around the outer surface of the record sheet. Thus, as may be seen in Fig. 6, the record sheet R extends around the platen in contact with the surface thereof, and the leading edge of the record sheet extends between the feed rollers 190 and the platen and over the top of the platen beneath the auxiliary feed roller 215. The strip S and carbon sheet C, however, pass around the platen outside the record sheet and are maintained in effective feeding relation with the auxiliary feed roller 215 by two releasable feed rollers 222.

The general arrangement of the applying and releasing means for the feed rollers 222 may be similar to that just described for the feed rollers 190. However, pairs of carrier members 223 (see Fig. 16) are provided for supporting each of the feed rollers 222 on companion pivots 224, but these carrier members are shaped differently at their rearward end portions from the carrier members 196 for the feed rollers 190 in order to hold the feed rollers 222 in contact with the auxiliary feed roller 215 rather than in contact with the platen. A guide slot 223ª is provided at the forward end portion of each of the carriers 223 to receive the rock shaft 176, and the rearward portion thereof is provided with a cam slot 223ᵇ which is somewhat different in shape from the cam slot 196ᵇ of the carriers 196 to conform with the movement of the feed rollers 222 to and from the auxiliary feed roller 215. A plate 225 similar to the plate 201 is associated with each of the carriers 223, and a pin 225ª is secured to each of the plates 225 and enters the cam slot 223ᵇ of the associated carrier 223. Each of the plates 225 is provided with an aperture receiving the rock shaft 176, and the plates 225 are frictionally mounted for adjustment along the rock shaft 176 and the guide bar 205 in identically the same manner as the plates 201 associated with the feed rollers 190.

The feed rollers 222 are moved to and from effective position with relation to the auxiliary feed roller 215 by a toggle means which is substantially the same construction as the toggle means employed to control the feed rollers 190. Thus, the two companion carriers 223 are united by a cross rod 226 to which a pair of links 227 are pivotally connected. The forward end of each of the pair of companion links 227 is pivotally connected to a companion arm 228, and the two arms are joined by a hub member 229. A manual operating means, however, is not provided on the arms 228, but each of these arms is provided with an integral projection 228ª (see Fig. 6) which enters a longitudinal V-shaped groove 176ª in the rock shaft 176. Thus, a turning movement of the rock shaft 176 in a clockwise direction as viewed in Fig. 6 will cause a movement of both feed rollers 222 to their released position shown in Fig. 17 in the same manner that a manual operation of the finger pieces 213 causes a release movement of the feed rollers 190.

It will be clear that the feed rollers 190 are moved to their released position by a rearward movement of the finger pieces 213 in order to introduce the record sheet R into the machine with the aid of the usual platen knobs or twirlers 199 attached to the extending platen shaft 33. The record sheet may then be adjusted on the platen to the first writing line position with the aid of the line indicating wire 160, and when in proper position, the finger pieces 213 may be operated forward to move the feed rollers 190 against the marginal portion of the record sheet, thus retaining the proper position of the sheet relative to the platen.

It was previously pointed out that the lever 173 is moved forward by the operator to effect a forward and downward movement of the line indicating wire 160 as well as a forward and upward movement of the deflector section 156, thereby facilitating the introduction of the strip S and carbon paper C as shown in Fig. 17. This forward movement of the lever 173 also turns the rock shaft 176 through the gears 172 and 174 to move the feed rollers 222 forward and downward away from the auxiliary feed roller 215 at the same time the line indicating wire and the deflector section 156 is thus moved into released position. This permits the strip S and carbon paper C to be easily introduced downwardly in front of the auxiliary feed roller and around the lower side of the platen in the manner indicated in Fig. 17. When the strip S is thus moved approximately to the first writing line position the lever 173 may be moved rearwardly to cause the feed rollers 222 to press the strip S and carbon paper C into effective feeding relation to the auxiliary feed roller and to return the line indicating wire and deflector section 156 to their normal position. Accurate adjustment of the strip and carbon sheet with reference to the printing line may be effected before the feed rollers 222 and the line indicator are fully restored to operative position.

The usual automatic line spacing mechanism coacts with the previously described power actuating carriage return mechanism to cause a line spacing movement of platen at the initial part of the carriage return operation. This line spacing mechanism, insofar as its cooperation with the platen is concerned, is the same as that shown in the patent to E. S. Dodge No. 2,037,769, dated April 21, 1936. In accordance with our present invention, however, means are provided for effecting a line spacing movement of the auxiliary feed roller simultaneously with the line spacing movement of the platen as will now be described.

The power operated carriage return rack 55 is mounted in the usual manner for longitudinal sliding movement relative to the rear carriage rail. Referring to Figs. 2 and 5, it will be seen that the right hand end of the rack 55 coacts with a depending pin 230 on a crank arm 231 which is fixed to the lower end of a vertically disposed shaft 232. The shaft is mounted in a bracket 233 secured to the right hand end plate 35 of the case shiftable platen frame, and a spring 240 is arranged to return the arm 231 to its normal position where the pin 230 engages the end of rack 55. An arm 234 is secured to the upper end of the shaft 232, and a depending pin 235 on this arm coacts with an offset ear 236 (see Fig. 2) of an actuating slide member 237. The rearward end of the actuating slide 237 is provided with a horizontal slot 238 which receives a pin 239 carried by an upstanding portion of the case shiftable platen frame. The mounting for the forward end of the actuating slide 237 is not shown in the accompanying drawings, but it is to be understood that said slide is connected in the usual manner to the upper end of an arm pivoted to the carriage frame, which arm may, if desired, be actuated by a manual line spacing lever.

The forward end portion of the actuating slide 237, shown in Fig. 5, is pivotally connected to the forward end of a link 242, which in turn is pivotally connected at its rearward end to a feed pawl 243. The pawl 243 is pivotally mounted at 243a to the upper end of a pawl carrier arm 244 which is mounted to turn around the right hand platen shaft 33.

It will be noted that the returning spring 240 for the vertical actuating shaft 232 tends to hold the parts of the line spacing mechanism in their position shown in Fig. 5. It will be noted that further movement of the pawl 243 relative to the carrier 244 is prevented by the engagement of a pin 246 on the pawl with the wall of an enlarged opening in the carrier, and further movement of the carrier 244 around the axis of the platen is prevented by the engagement thereof with a lug 248 extending from a line spaced regulating arm 250. The manual means for adjusting the position of the regulating arm 250 has not been shown in the drawings but it is to be understood that this mechanism may be of the usual construction including a finger piece for adjusting and holding the arm 250 in any one of a plurality of different positions to regulate the normal position of the carrier 244 and accordingly regulate the extent of line spacing movement of the pawl 243.

A detent roller 252 is carried at the end of a leaf spring 253 attached to the carriage frame in the usual manner, whereby the roller 252 is resiliently pressed into engagement with two adjacent teeth of a line spacing ratchet wheel 255 operatively connected to the platen 32 to resiliently hold the platen in a definite line spaced position. It will now be clear that upon the initiation of a power actuated carriage return movement, the rack 55 will be moved longitudinally relative to the carriage before the carriage is returned. This results in engaging the pin 239 and operating the parts through the mechanism just described to first effect a movement of the pawl 243 into an interdental space in the line spacing ratchet wheel 255 and to then rotate the wheel a distance of one or more tooth-spaces as determined by the setting of the line space regulating means.

The automatic line spacing mechanism shown in Fig. 5 also includes the devices disclosed in said Dodge Patent No. 2,037,769 for preventing an unintentional line spacing operation during a tabulating or other rapid movement of the carriage in a line spacing direction. This mechanism may be briefly described as including a locking member 258 mounted at 259 for vertical sliding movement and operatively connected by an adjusting screw 260 to the feed rack 44 to be moved upward by a releasing movement of said feed rack. An adjustable stop screw 262 is carried by the stop member 258 so that normally during a proper line spacing operation, the open end of the slot 238 in the actuating slide member 237 receives the forward end of the screw 262 whereby no resistance is offered to such line spacing operation. However, in the event the feed rack 44 is raised to release the carriage when the platen is in its lower case position as shown, the locking member 258 is moved upward to position the end of the screw 262 in the path of movement of the upper end portion of the actuating slide 237 above the slot 238 and thereby prevent an effective operation of the line spacing mechanism. When the feed rack 44 is raised by the shifting of the platen to its upper case position the end of the screw 262 is disposed in the path of movement of the lower end position of the actuating slide 237 below the slot 238 and likewise prevents effective line spacing operation.

In addition to effecting a line spacing movement of the platen, the actuating slide 237, in accordance with our invention, is arranged to also cause a line spacing movement of the auxiliary feed roller 215. Referring to Figs. 2, 4 and 5, it will be seen that a bracket 270 is attached at 271 to the actuating slide 237, and an inwardly extending pin 272 at the upper end of the bracket 270 enters a slot 273 in an auxiliary actuating arm 274. This arm is pivotally mounted at 276 on the bracket 221 which is provided in the present construction for supporting the right hand end of the auxiliary feed roller 215. The upper end of the arm 274 is pivotally connected to the rearward end of a link 278 which is pivotally connected at its forward end to a feed pawl 279. Said pawl in turn is pivotally mounted at 280 at the upper end of a carrier arm 281 which is mounted to turn about the axis of the auxiliary feed roller 215. The lower end portion 279a of the feed pawl 279 is shaped to enter the interdental spaces of an auxiliary line spacing ratchet wheel 283 fixedly secured to the extreme right hand end portion of the shaft 217 which carries the auxiliary feed roller 215.

An individual coiled returning spring 284 is provided for the auxiliary line spacing mechanism, said spring surrounding the sleeve bearing member 139 (see Figs. 2 and 4). The stationary end of the spring 284 is anchored to a collar 285 secured to the bearing sleeve 220 while the other end of the spring is connected to a pin 286 extending inwardly from the carrier arm 281. The return movement of the carrier arm 281 (Fig. 5) under the force of the spring 284 is arrested by the engagement of the pivot screw 280 with a shouldered portion 287 on the bracket 221. The pivotal release movement of the pawl 279 on the carrier arm 281 is arrested by engagement of the pawl with a pin 288 secured to the bracket 221. A detent arm 290 is pivotally mounted at 291 to the auxiliary bracket 221, and a beveled forward end portion 290a is normally urged into an interdental space in the auxiliary line spacing wheel 283 by the force of a spring 292, whereby the auxiliary feed roller 215 is resiliently held in a definite line spaced position of rotation.

The connecting means between the usual line spacing actuating slide 237 and the auxiliary line spacing pawl 279 are so arranged that an extent of rotation of the auxiliary feed roll 215 will be effected at each operation which advances the form strip S substantially the same distance as the record sheet R is advanced by the usual line spacing mechanism. In other words, the auxiliary feed roller 215, being slightly smaller in diameter than the platen, is given a slightly greater extent of angular line spacing movement so that the line spacing on both the record sheet R and the strip S will be the same. However, if it is found desirable for any particular purpose, it will be clear that the parts of the auxiliary line spacing mechanism could be arranged to provide either a greater or a lesser extent of line spacing movement of the strip S than is given the record sheet R by the usual line spacing mechanism.

It has been previously pointed out herein that in accordance with this invention, an extra long feed movement of the strip S is at times automatically effected in addition to the line spacing movement just described. This long feeding movement of the strip S is effective after the last line has been written on one form in order to bring the next form on the strip to the first writing line position. Accordingly, the mechanism for affording this long feed movment of the strip S is arranged in accordance with the present invention to be effective only when the operator releases the carriage return key 85 as soon as the return movement of the carriage has been initiated to cause the carriage to return to its extreme right hand position determined by the setting of the margin stop 145. Thus, when the operator holds the carriage return key 85 in its depressed position until the carriage is returned only to its intermediate position, determined by the setting of the bracket 119, the extra long feed movement will not be given and the strip S will receive only a line spacing movement.

Referring to Fig. 1, it may be seen that the bearing member 218 at the left hand end of the auxiliary feed roll is provided with a laterally offset portion or yoke 218ª, and, as will be seen in Fig. 10, the auxiliary feed roll shaft 217 terminates within this yoke 218ª. A shaft section 301 is disposed in the remaining portion of the bearing member 218 in axial alignment with the auxiliary feed roll shaft 217, and means are provided within the offset bearing portion or yoke 218ª for at times operatively connecting the shaft section 301 with the auxiliary feed roll shaft 217, as will hereinafter be described in detail.

The left hand end of the shaft section 301 extends through the bracket member 219, and a spiral gear 302 is fixedly secured by a pin 303 to the extending end of said shaft section 301. A companion spiral gear 304 meshes with the gear 302 and is disposed above the gear 302 on an axis at right angles to the axis of the shaft section 301. The gear 304 is fixedly secured by a pin 305 to a shaft section 306 which is mounted in a yoke bearing 307 (see Fig. 3) secured to the auxiliary bracket 219.

Referring to Figs. 1 and 3, the rearward end of the shaft 306 is operatively connected through a double universal joint mechanism to the forward end of a similar shaft 310 which is rotatively mounted in a yoke bearing portion 311 of a bracket 312 (shown in detail in Fig. 8) which is mounted at 313 on the rear carriage rail 26. Inasmuch as the shaft 306 is mounted on the case shiftable platen frame while the bracket 312, which carries the shaft 310, does not receive a case shifting movement, the double universal joint mechanism maintains an operative connection between the shafts 306 and 310 regardless of the case shifted position of the platen frame.

Referring to Figs. 1 and 3, it may be seen that this double universal joint mechanism is of a conventional construction including two pairs of yoke members 316, each pair being operatively connection by oppositely disposed pivots of a swivel block 317. The front yoke member 316 is fixedly connected at 318 to the shaft 306 and the rear yoke member 316 is fixedly connected at 319 to the shaft 310. A connecting shaft section 320 is fixedly connected at 321 to the other yoke member of the front pair, and the other end of the shaft section 320 is provided with a spline connection to the front yoke of the rear pair. This spline connection affords a slight longitudinal movement of the shaft 320 relative to the rear section of the universal joint mechanism during the case shifting movement of the shaft 306 relative to the shaft 310.

A pinion gear 325 is fixed at 326 (see Fig. 7) to the intermediate portion of the shaft 310, which pinion meshes with a gear sector 328 having a hub portion rotatively mounted on the stem of a shouldered screw 329 attached to a depending portion 330 of the bracket 312, shown in detail in Fig. 8. An integral arm 332 extends on the opposite side of the pivotal axis of the gear sector 328 as may be seen in Fig. 7, which arm carries a roller 333 mounted to turn on a headed pin 334. A spring 336 is provided around the hub portion of the gear sector 328, one end of the spring being connected by a pin 337 to the gear sector while the other end is connected to the depending lug 339 of the bracket 312.

The spring 336 exerts a force on the gear sector 328 which holds the roller 333, at the end of the arm 332, into engagement with the upper surface of a cam or track member 340 which is fixedly secured at 341 on the left hand rear portion of the top plate 21. During the latter part of the return movement of the carriage to its extreme right hand position determined by the adjustable carriage return stop 145, the roller 333 engages the rolls upward on an inclined portion 340ª of the track member 340, and as the carriage reaches its extreme right hand position, the roller is positioned on the horizontal dwell portion of the track or cam member as shown in Fig. 7. As the carriage is moved to the left from such extreme right hand position, the roller 333 moves downwardly along an inclined portion 340ª of the track member under the force of the spring 336.

The normal position of the gear sector 328 and arm 332 when the roller 333 is not in engagement with the track member is determined by a blank portion 345 at the end of the gear sector engaging with the teeth of the pinion 325. Accordingly it will be clear that during each full return movement of the carriage to its extreme right hand position, determined by the carriage return stop 145, the roller 333 will coact with the track member 340 to cause a uniform extent of clockwise rotation of the gear sector 328. This clockwise movement of the gear sector 328 will operate through the pinion gear 325, the universal point mechanism and the gears 304 and 302 to cause a counterclockwise rotation of the shaft 301 as viewed from the left hand end of the machine as in Fig. 3.

The intermediate carriage return bracket 119 is adjusted so that the roller 333 does not coact with the track 340 during the return movement of the carriage to its intermediate position effected by holding the carriage return key 85 in its depressed position throughout the carriage return movement. Thus, when the carriage is returned to its intermediate position, the roller 333 is not carried sufficiently far to the right to engage the track member 340 and accordingly the gear sector 328 does not receive a clockwise operating movement and the shaft section 301 is not rotated.

It was previously pointed out that means are provided in accordance with the present invention for at times operatively connecting the shaft section 301 with the auxiliary feed roll shaft 217. Thus, the mechanism shown in Figs. 10, 11 and 12, operates to effect a counterclockwise direction of rotation of the shaft 217 during the previously described counterclockwise direction of rotation of the shaft 301 effected by the upward movement of the roller 333 on the inclined track portion 340a but to allow the shaft 301 to turn in clockwise direction relative to the shaft 217 during the downward movement of the roller 333 on the inclined track portion 340a. This arrangement also affords intermittent line spacing movements of the shaft 217 relative to the shaft 301 under control of the previously described auxiliary line spacing mechanism at the left hand end of the shaft 217 as hereinafter more clearly pointed out.

Thus by referring to Figs. 10, 11 and 12, it will be seen that a disc 350 is provided within the yolk or offset portion 218a of the bearing member 218, and this disc is fixedly secured at 351 to the end of the shaft section 301. A pawl 353 is mounted to turn on a shouldered pin 354 secured to the disc 350, and a second pin 355, fixedly secured to the disc 350, carries a spring member 356 acting inwardly on the tail portion of the pawl 353. An intermediate connecting member 358 is loosely mounted to turn about the end of the shaft 217, and the periphery of this intermediate member is provided with evenly spaced ribs 359 extending to the left as viewed in Fig. 10 to form internal teeth with which the end portion 353a of the pawl 353 coacts under the force of the spring 356. The teeth 359 are arranged at intervals corresponding to the extent of line spacing movement of the auxiliary feed roller 215, and a detent member 362 is secured at 363 to the yoke 218a of the bearing member 218. The detent member is provided with a curved free end portion 362a coacting with the external surfaces of the teeth 359 to resiliently retain the intermediate member 358 in a definite line spaced position.

A pawl 365 similar to the pawl 353 is mounted to turn on a shouldered pin 366 secured to the intermediate member 358. A pin 367 secured to the intermediate member 358 also carries a spring member 368 acting on the tail portion of the pawl 365. A disc member 370 having a flange portion 370a is fixedly secured at 371 to the end portion of the shaft 217, and a notch or slot 372 is provided in the flange portion 370a into which an end portion 365a of the pawl 365 is moved under the force of the spring 368 at the position of the parts shown in Fig. 12.

In writing the first check indicated as No. 517 on the strip S in Fig. 15, the relative sidewise position of the record sheet R, carbon paper C and strip S will be substantially as shown in Fig. 15, but the strip S will be positioned with relation to the record sheet R so that the first writing line on the record sheet and the first writing line on the first check, which is just below the solid line shown thereon, will both be positioned at the printing line of the machine. The carriage return stop 145 is then positioned so that when the carriage is returned to its extreme right hand position, the printing point will be at or to the left of a point where it may be desired to write the first character in the extreme left hand column on the "check register" or the record sheet R.

With the work sheet thus inserted in the machine, the first entry may be made at the desired point in the portion of the "check register" at the left of the strip S, after which the carriage may be moved to the left by the space key or by the tabulator mechanism into proper position for starting the first line of writing on the check, such as at the margin line 376 shown on the drawings. The first line of the check may then be written and the desired entry made on the "check register" at the right of the strip S as shown in Fig. 15, and if only one line is to be written on the check, as is the case in the first check shown the operator momentarily presses the return key 85 thereby causing a full return movement of the carriage to its extreme right hand position determined by the margin stop 145.

At the initial part of this return movement of the carriage the usual line spacing mechanism effects a line spacing movement of the platen, and the auxiliary line spacing mechanism at the right hand end of the platen simultaneously effects a line spacing movement of the auxiliary feed roller 215 in the manner previously described. Thus, at the beginning of the return movement of the carriage, the flanged disc member 370 at the left hand end of the shaft 217 is turned in a counterclockwise direction as viewed in Fig. 12 to an extent corresponding to this line spacing movement of the auxiliary feed roller 215. Inasmuch as the detent member 362 is effective to hold the intermediate connecting member 358 against turning with the member 370, the pawl 365 will not be turned by this movement of the member 370 and accordingly the notch or opening 372 in the flange 370a will be advanced in a counterclockwise direction relative to the end 365a of the pawl. The extent of line spacing movement of the auxiliary feed roller will of course depend on the usual line space adjustment at the right hand end of the carriage, and the extent of advance movement of the slot 372 relative to the end 365a of the dog will correspond thereto.

During the latter part of this full extent of carriage return movement to the extreme right hand position, the shaft section 301 will be turned in a counterclockwise direction, as seen in Fig. 11, through the cooperation of the roller 333 with the track member 340 in the manner previously described. This turning movement of the shaft 301 will operate through the engagement of the pawl 353 with one of the teeth 359 to cause a corresponding extent of rotation of the intermediate connecting member 358. The initial turning movement of the intermediate connecting member 358, however, will not be transmitted to the disc member 370 inasmuch as the end portion 365a of the pawl 365 is not in contact with the wall of the slot 372 due to the previous turning of the member 370 by the line spacing movement of the auxiliary feed roller 215. In other words, the intermediate connecting member 358 turns in a counterclockwise direction relative to the disc member 370 to the extent of the previous line spacing movement of the auxiliary feed roller before the turning movement of the intermediate connecting member 358 is transmitted to the auxiliary feed roller through the member 370.

In the present instance, the parts in the mechanism are so arranged that the cooperation of the roller 333 with the track member 340 causes an extent of rotation of the shaft section 301 which is just sufficient to rotate the auxiliary feed roller 215 the required extent to feed the strip S from a position where the first writing line on one check is in a printing position to a position wherein the first writing line on the next check is at the same printing position. However, the full extent of rotation of the shaft section 301 is never transmitted to the auxiliary feed roller inasmuch as the auxiliary feed roller is always turned at least one line space distance in advance of the shaft section 301 before it is rotated.

In the example just described, wherein a single line only is written on the first check of the strip S, the single extent of line spacing feed movement of strip S at the initial part of the carriage return movement is, in effect, subtracted from the extent of movement which would otherwise be transmitted thereto from the shaft section 301. In other words, the rotation of the shaft section 301 first turns the pawl 365 relative to the member 379 to compensate for the previous line spacing of the first check so that the remaining extent of rotation of the shaft section 301 is effective to just bring the next check to the first line writing position.

When the carriage moves to the left in a letter spacing direction after it has been fully returned to its right hand position, the roller 333 moves downwardly along the inclined track portion 340ª under the force of the spring 336 to afford a reverse direction of rotation of the shaft section 301 until the sector gear 328 reaches normal position. This reverse rotation of the shaft section 301 causes the pawl 353 to turn in a clockwise direction as viewed in Fig. 11, and accordingly the contact end 353ª of the pawl does not effectively coact with the teeth 359 to drive the intermediate member 358 so that the auxiliary feed roller is not turned by the return movement of its driving mechanism to normal position.

In some instances it will be desirable to write more than one line on a single check, such for example as on the other checks shown in Fig. 15. Accordingly after writing the first line, the operator holds the carriage return key 85 in its depressed position which will return the carriage only to its intermediate position for starting the second line of writing at the margin line 376. In this instance, it will be clear that both the platen and the auxiliary feed roller 215 receive a line spacing movement, but as the carriage does not return to a position wherein the roller 333 coacts with the track member 340, the auxiliary feed roller 215 is not rotated through the shaft section 301. In this manner, either one, two, three or more lines may be written on each check before the carriage is fully returned to its extreme right hand position by a momentary depression of the carriage return key 85.

In each instance, however, it will be clear that the line spacing movement of the auxiliary feed roller turns the member 379 relative to the pawl 365 on the intermediate connecting member 353 so that after the last line has been written on each check, the slot 372 will have advanced relative to the pawl 365 through a distance equal to the total extent of line spacing movements of the auxiliary feed roller. When the carriage is fully returned to its extreme right hand position, this total extent of line spacing movement of the last check will be deducted from the feed movement effected through the rotation of the shaft section 301. In this manner each check is fed by the auxiliary feed roller 215 during a full return movement of the carriage to a position where the first writing line thereon is always positioned at the printing line regardless of the number of lines which were written on the previous check.

The present machine is thus arranged to write any required number of lines at regular line space intervals on each check or form, which writing is duplicated at the same line space intervals on the record sheet. After the last line has been written on a check or form, the next form is automatically fed to the first line writing position while the record sheet merely receives a line spacing movement. In this manner, the operator is able to easily and quickly make the desired entries on each of a series of attached forms and at the same time duplicate all of such entries in condensed form on the record sheet. Additional matter that is not recorded on the check strip may, if desired, be entered on the record strip as hereinbefore pointed out.

In certain instances, it may be desirable to use the present machine for other purposes than just described wherein it would not be necessary to operate the long feeding mechanism for the auxiliary feed roller each time the carriage was fully returned. Accordingly, means have been provided for silencing or rendering this long feeding mechanism inoperative.

Referring to Fig. 7, it will be seen that a bracket member 380 is attached at 381 to the upstanding portion of the bracket 312 to extend downwardly along the front side of the arm 332. The bracket 380 coacts with a latch in the form of a slide member 384 having a longitudinal slot therein receiving headed screws 385 whereby the member 384 is mounted for sliding movement on the arm 332. In the normal position of this latch member 384, as shown in Fig. 7, a laterally extending lug 384ª moves freely past the lower end of the bracket 380, but when the arm 332 is raised slightly above its normal position shown in Fig. 7, the latch 384 may be moved toward the axis of the arm 332 to a position where the lug 384ª engages a shoulder 380ª on the bracket 380. The arm 332 may thus be latched out of effective cooperation with the track member 340 so that, when desired, the entire mechanism for affording a long extent of feed movement from the left hand end of the auxiliary feed roller will be inactive.

From the foregoing description, it will be apparent that we have provided an improved means for independently feeding a plurality of sheets into position for simultaneously entering items thereon which means may be readily embodied in existing machines without modifying, or materially modifying the existing structural features thereof.

An important feature of this mechanism is in the provision of means whereby a line spacing movement of both the form strip and the record sheet is simultaneously effected during the return movement of the carriage to one predetermined position, and the provision of means whereby an extra long feed movement of the form strip only and relatively to record sheet is effected during the return movement of the carriage to another predetermined position. In the machine to which our invention has been applied in the present instance, the operator may selectively cause the carriage to be automatically returned either to one predetermined position or another, and accordingly the present invention when applied thereto enables the operator to at will cause either a line spacing movement or an extra long feed movement of the form strip according to the extent of return movement of the carriage.

Another important feature of the present invention is the provision in the above mechanism of means whereby the form strip S is moved during the return movement of the carriage the required amount to bring each form thereon to the first writing line position irrespective of the number of lines written on the preceding form. In other words, the mechanism of the present invention is so arranged that any required number of lines within given limits may be written on each form, at which time the form strip receives only a line spacing movement, and when the last line has been written the extent of long feed movement of the strip will be automatically regulated according to the number of lines written on that form to bring the next form to the first writing line position.

Various changes may be made in the construction, and certain features thereof may be employed without others, without departing from our invention as it is defined in the accompanying claims.

What we claim as new and desire to secure by Letters Patent is:

1. In a typewriting or like machine, the combination of a carriage, a platen carried thereby, power actuated means for returning the carriage, feed rollers that coact with the platen to feed a record sheet, auxiliary feed rollers cooperative one with another to feed an interposed work sheet independently of the platen, line spacing mechanism controlled by the return of the carriage for intermittently line spacing the platen and auxiliary feed rollers in unison for line spacing the record and work sheets together, and independently operable means controlled by the return of the carriage for actuating said auxiliary feed rollers for feeding said work sheet independently of the platen and record sheet.

2. In a typewriting or like machine, the combination of a carriage, a platen carried thereby, auxiliary feed rollers cooperative one with another to feed an interposed work sheet independently of the platen, line spacing mechanism for actuating said auxiliary feed rollers and said platen in unison, and means for actuating said auxiliary feed rollers by the return of the carriage to effect a feed of the work sheet from one form thereon to another.

3. In a typewriting or like machine, the combination of a carriage, a platen on said carriage, line spacing mechanism for said platen, feed rollers cooperative one with another to feed an interposed work sheet, and means for actuating said feed rollers comprising means for intermittently line spacing the feed rollers in unison with the line spacing of the platen to simultaneously line space a record sheet and a work sheet, and power actuated means for returning said carriage and for effecting an independently relatively long feed of the feed rollers to advance the work sheet relatively to the platen and record sheet, said last mentioned means including means to advance at a single operation the work sheet to the first writing line position of a form thereon irrespective of the number of lines written on the preceding form on the work sheet.

4. In a typewriting or like machine, the combination of a carriage, a platen on said carriage, carriage returning means, line spacing mechanism for said platen, feed rollers cooperative one with another to feed an interposed work sheet, and means for actuating said feed rollers comprising means for intermittently line spacing the feed rollers in unison with the line spacing of the platen to simultaneously line space a record sheet and a work sheet, and means for effecting an independent relatively long feed of the feed rollers to advance the work sheet relatively to the platen and record sheet, said last mentioned means comprising a spacing member that is operatively connected to said feed rollers to be advanced by the line spacing movements and independently actuated driving means operated by the return of said carriage and coacting with said spacing member to advance it only from the position to which it has been advanced by the line spacing movements of said feed rollers.

5. In a typewriting or like machine, the combination of a carriage, a platen carried thereby, line spacing means for the platen, power actuated means for returning said carriage, feed rollers cooperative one with another to feed an interposed work sheet, and means controlled by the return movement of the carriage for actuating said feed rollers comprising means for intermittently line spacing the feed rollers in unison with the line spacing of the platen to simultaneously line space a record sheet and a work sheet, and means controlled by the return movement of the carriage for effecting an independent relatively long feed of the feed rollers to advance the work sheet relatively to the platen and record sheet, said last mentioned means including means to advance at a single operation the work sheet to the first writing line position of a form thereon irrespective of the number of lines written on the preceding form on the work sheet.

6. In a typewriting or like machine, the combination of a carriage, a platen carried thereby, line spacing means for the platen, power actuated means for returning said carriage, feed rollers cooperative one with another to feed an interposed work sheet, and means controlled by the return movement of the carriage for actuating said feed rollers comprising means for intermittently line spacing the feed rollers in unison with the line spacing of the platen to simultaneously line space a record sheet and a work sheet, and means controlled by the return movement of the carriage for effecting an independent relatively long feed of the feed rollers to advance the work sheet relatively to the platen and record sheet, said last mentioned means comprising two long feed members one of which is advanced independently of the other during the line spacing movements of the work sheet, and independently operable means controlled by the return movement of the carriage for advancing the other of said long feed members for coaction with the first mentioned long feed member only from the advanced position it has assumed during the line spacing operation to bring one form on the work sheet to the first writing line position irrespective of the number of lines written on the preceding form.

7. In a typewriting or like machine, the combination of auxiliary feed rollers cooperative one with another to feed an interposed work sheet, and means for actuating said feed rollers to line space said work sheet and also to effect a long feed thereof, said means comprising two axially aligned shafts one fixedly connected to one of said feed rollers and carrying a long feed member that is advanced independently of the other shaft during the intermittent line spacing movements of the feed rollers, a second long feed member operatively connected to the other shaft and operative to advance the first mentioned long feed member only from the advanced position it has assumed during the line spacing operation, and independently operable means for actuating said second long feed member.

8. In a typewriting or like machine, the combination of auxiliary feed rollers cooperative one with another to feed an interposed work sheet, and automatically operating means for actuating said feed rollers to line space said work sheet and also to effect a long feed thereof, said means comprising two axially aligned shafts one fixedly connected to one of said feed rollers and carrying a long feed member that is automatically advanced independently of the other shaft during the intermittent line spacing movements of the feed rollers, a second long feed member operatively connected to the other shaft and operative to advance the first mentioned long feed member only from the advanced position it has assumed during the line spacing operation, and automatically actuated independently operable means for actuating said second long feed member, whereby the work sheet may be automatically advanced to the first writing line position on a form thereon irrespective of the number of lines written on the preceding form on said work sheet.

9. In a typewriting or like machine, the combination of a carriage, a platen carried thereby, power actuated means for returning said carriage, auxiliary feed rollers cooperative one with another to feed an interposed work sheet, means connected to one end of one of the auxiliary feed rollers and controlled by one extent of the return of the carriage to line space the work sheet, and separate means connected to the other end of said one of the auxiliary feed rollers and controlled by a different extent of the return movement of the carriage to effect a relatively long feed of the work sheet controlled thereby.

10. In a typewriting or like machine, the combination of a carriage, a platen carried thereby, means for returning said carriage, auxiliary feed rollers cooperative one with another to feed an interposed work sheet, a first actuating means controlled by the initial portion of the return movement of the carriage for actuating said auxiliary feed rollers to line space the work sheet controlled thereby, a second actuating means controlled by further return movement of the carriage for actuating said auxiliary feed rollers to effect a relatively long feed of the work sheet controlled thereby, and means operable at will to interrupt the return movement of the carriage before said second actuating means becomes effective, whereby more than a single line spacing operation of the auxiliary feed rollers may be effected before the long feed thereof is effected.

11. In a typewriting or like machine, the combination of a carriage, a platen carried thereby, power actuated means for returning said carriage, auxiliary feed rollers cooperative one with another to feed an interposed work sheet, a first operating means controlled by the initial portion of the return movement of the carriage for actuating said auxiliary feed rollers to line space the work sheet controlled thereby, a second operating means controlled by further return movement of the carriage for actuating said auxiliary feed rollers to effect a relatively long feed of the work sheet controlled thereby, and means operable at will to interrupt the return movement of the carriage before said actuating means becomes effective, whereby more than a single line spacing operation of the auxiliary feed rollers may be effected before the long feed thereof is effected.

12. In a typewriting or like machine, the combination of a carriage, a platen carried thereby, auxiliary paper feeding means carried by the carriage, power actuated means for returning said carriage, key controlled means for selectively causing said carriage to be returned by said power actuated means to either of two predetermined positions, means operated by the return movement of the carriage to either of said two predetermined positions for automatically effecting a line spacing movement of said platen and said auxiliary paper feeding means, and means operated by the return movement of the carriage to only one of said two predetermined positions for automatically effecting a relatively long feeding movement of the auxiliary paper feeding means.

13. In a typewriting or like machine, the combination of a carriage, paper feeding means carried by the carriage, power actuated means for returning said carriage, key controlled means for selectively causing said carriage to be returned by said power actuated means to either of two predetermined positions, means operated by the return movement of the carriage to either of said two predetermined positions for automatically effecting a line spacing movement of said paper feeding means, and means operated by the return movement of the carriage to only one of said two predetermined positions for automatically effecting a relatively long feeding movement of the paper feeding means.

14. In a typewriting or like machine, the combination of a carriage, paper feeding means carried by the carriage, power actuated means for returning said carriage, key controlled means for selectively causing said carriage to be returned by said power actuated means to either of two predetermined positions, and means operated by the return movement of the carriage to one of said two predetermined positions for automatically effecting a relatively long feeding movement of the paper feeding means.

15. In a typewriting or like machine, the combination of a carriage, paper feeding means, means for selectively causing said carriage to be returned to either of two predetermined positions, means operated by the return movement of the carriage to either of said two predetermined positions for automatically effecting a line spacing movement of said feeding means, and means operated by the return movement of the carriage to only one of said two predetermined positions for automatically effecting a relatively long feeding movement of said paper feeding means.

16. In a typewriting or like machine, the combination of a carriage, a platen carried thereby, auxiliary paper feeding means carried by the carriage, carriage returning means for selectively returning said carriage to either of two predetermined positions, line spacing means controlled by said carriage returning means for automatically causing a line spacing movement of said platen and said auxiliary paper feeding means, and means controlled by the return movement of said carriage to one only of said two predetermined positions for automatically causing a relatively long feed movement of said auxiliary paper feeding means.

17. In a typewriting or like machine, the combination of a carriage, paper feeding means carried by the carriage, carriage returning means for selectively returning said carriage to either of two predetermined positions, line spacing means controlled by said carriage returning means for automatically causing a line spacing movement of said paper feeding means, and means controlled by the return movement of said carriage to one only of said two predetermined positions for automatically causing a relatively long feed movement of said paper feeding means.

18. In a typewriting or like machine, the combination of a carriage, paper feeding means carried by the carriage, carriage returning means for selectively returning said carriage to either of two predetermined positions, and means controlled by the return movement of said carriage to one only of said two predetermined positions for automatically causing a relatively long feed movement of said paper feeding means.

19. In a typewriting or like machine, the combination of a platen, a deflector movable from a position adjacent the platen to a paper receiving and guiding position, and controlling means for said deflector comprising a spring pressed bail for supporting the deflector in effective position adjacent the platen, a manually operative rock shaft, releasing means controlled by said rock shaft for moving said bail away from the platen, and means operatively connecting said deflector with said rock shaft for movement thereby on said bail to a position for receiving and guiding work sheets beneath the platen.

20. In a typewriting or like machine, the combination of a platen, a deflector movable from a position adjacent the platen forwardly to a paper receiving and guiding position, and controlling means for said deflector comprising a movable support normally holding the deflector in closed position, and releasing means for moving said support away from the platen and for bodily moving the deflector forward on the support to a position for receiving and guiding work sheets beneath the platen.

21. In a typewriting or like machine, the combination of a platen, a paper deflector movable from a position adjacent the platen to a paper receiving and guiding position, an auxiliary feed roller, releasable feed rollers cooperating with said auxiliary feed roller, a manually operative rock shaft, means controlled by said rock shaft for withdrawing said releasable feed rollers from effective cooperating relation with said auxiliary feed roller, a movable support normally holding said paper deflector adjacent the platen and means controlled by said rock shaft for moving said support away from the platen and for bodily moving said paper deflector forward on said support to a position for receiving and guiding work sheets beneath the platen.

22. In a typewriting or like machine, the combination of a carriage, paper feeding means carried thereby, and actuating means for said paper feeding means including a stationary track member having a portion angularly disposed with relation to the direction of carriage movement, an actuating shaft mounted on the carriage, an arm operatively connected with said actuating shaft and coacting with said track member upon movement of the carriage in one direction to turn said actuating shaft, spring means for returning said actuating shaft upon movement of the carriage in the other direction, and means connecting said actuating shaft with said paper feeding means to actuate the paper feeding means by the turning of the actuating shaft in one direction only.

23. In a typewriting or like machine, the combination of a carriage, a platen carried thereby, auxiliary paper feeding means carried by the carriage, carriage returning means for selectively returning said carriage to either of two predetermined positions, line spacing means controlled by said carriage returning means for automatically causing a line spacing movement of said platen and said auxiliary paper feeding means, long feeding means controlled by the return movement of said carriage to one only of said two predetermined positions for automatically causing a relatively long feed movement of said auxiliary paper feeding means, and means operable at will for rendering said long feeding means inoperative.

24. In a typewriting or like machine, the combination of a carriage, paper feeding means, carriage returning means for selectively returning said carriage to either of two predetermined positions, long feeding means controlled by the return movement of said carriage to one only of said two predetermined positions for automatically causing a relatively long feed movement of said paper feeding means and means operable at will for rendering said long feeding means inoperative.

25. In a typewriting or like machine, the combination of a carriage, paper feeding means, and actuating means for said paper feeding means including a stationary track member having a portion angularly disposed with relation to the direction of carriage movement, an actuating shaft mounted on the carriage and operatively connected with said paper feeding means, an arm operatively connected with said actuating shaft and arranged to be operated by engagement with said track member upon movement of the carriage, and manually operative latch means for at will holding said arm out of engagement with said track member.

ELBERT S. DODGE.
JOHN TOBIN.